United States Patent
Arrowood et al.

(10) Patent No.: US 9,643,128 B2
(45) Date of Patent: May 9, 2017

(54) THIN FILM COMPOSITE MEMBRANE DERIVED FROM TETRA-FUNCTIONAL ACYL HALIDE MONOMER

(71) Applicant: Dow Global Technologies LLC, Midland, MI (US)

(72) Inventors: Tina L. Arrowood, Elko New Market, MN (US); Aman A. Desai, Midland, MI (US); Steven D. Jons, Eden Prairie, MN (US); Mou Paul, Edina, MN (US); Abhishek Roy, Edina, MN (US)

(73) Assignee: Dow Global Technologies LLC, Midland, MI (US)

( * ) Notice: Subject to any disclaimer, the term of this patent is extended or adjusted under 35 U.S.C. 154(b) by 170 days.

(21) Appl. No.: 14/405,697

(22) PCT Filed: Jul. 3, 2013

(86) PCT No.: PCT/US2013/049176
§ 371 (c)(1),
(2) Date: Dec. 4, 2014

(87) PCT Pub. No.: WO2014/014662
PCT Pub. Date: Jan. 23, 2014

(65) Prior Publication Data
US 2015/0147470 A1    May 28, 2015

Related U.S. Application Data

(60) Provisional application No. 61/673,462, filed on Jul. 19, 2012, provisional application No. 61/673,467, filed on Jul. 19, 2012, provisional application No. 61/673,466, filed on Jul. 19, 2012, provisional application No. 61/673,456, filed on Jul. 19, 2012, provisional application No. 61/673,453, filed on Jul. 19, 2012, provisional application No. 61/674,634, filed on Jul. 23, 2012, provisional application No. 61/675,412, filed on Jul. 25, 2012, provisional application No. 61/775,814, filed on Mar. 11, 2013, provisional application No. 61/775,777, filed on Mar. 11, 2013.

(51) Int. Cl.
| | | |
|---|---|---|
| *B01D 67/00* | (2006.01) | |
| *B01D 69/12* | (2006.01) | |
| *B01D 71/56* | (2006.01) | |
| *B01D 61/02* | (2006.01) | |
| *B01D 69/10* | (2006.01) | |

(52) U.S. Cl.
CPC ....... *B01D 67/0006* (2013.01); *B01D 61/025* (2013.01); *B01D 67/0002* (2013.01); *B01D 69/10* (2013.01); *B01D 69/12* (2013.01); *B01D 69/125* (2013.01); *B01D 71/56* (2013.01); *B01D 2323/00* (2013.01); *B01D 2323/38* (2013.01); *B01D 2323/40* (2013.01); *B01D 2325/20* (2013.01)

(58) Field of Classification Search
None
See application file for complete search history.

(56) References Cited

U.S. PATENT DOCUMENTS

| | | |
|---|---|---|
| 3,304,310 A | 2/1967 | Hari et al. |
| 3,686,116 A | 8/1972 | Rio |
| 3,878,109 A | 4/1975 | Ikeda et al. |
| 4,259,183 A | 3/1981 | Cadotte |
| 4,277,344 A | 7/1981 | Cadotte |
| 4,529,646 A | 7/1985 | Sundet |

(Continued)

FOREIGN PATENT DOCUMENTS

| | | |
|---|---|---|
| CN | 1035338 | 9/1989 |
| CN | 1935338 | 3/2007 |
| CN | 101601975 A | 12/2009 |
| CN | 102219673 | 7/2014 |
| EP | 0556569 | 11/1993 |
| JP | 53146275 | 12/1978 |
| WO | 2011152735 | 12/2011 |
| WO | 2013048762 | 4/2013 |
| WO | 2013048763 | 4/2013 |

(Continued)

OTHER PUBLICATIONS

Machine Translation of CN 102219673 A.*

(Continued)

*Primary Examiner* — Michael Wieczorek
*Assistant Examiner* — Bradford Gates
(74) *Attorney, Agent, or Firm* — Edward W. Black

(57) ABSTRACT

A method for making a composite polyamide membrane including a porous support and a thin film polyamide layer, wherein the method includes the step of applying a polyfunctional amine monomer and a tetraacyl acyl halide monomer represented by Formula (I) to a surface of the porous support and interfacially polymerizing the monomers to form a thin film polyamide layer; wherein A is selected from: oxygen (—O—); carbon (—C—); silicon (—Si—); each of which may be unsubstituted or substituted, e.g. with alkyl groups of 1-4 carbon atoms; or a carbonyl group (—C(O)—), X is the same or different and is selected from a halogen, and Y is selected from halogen and hydroxide.

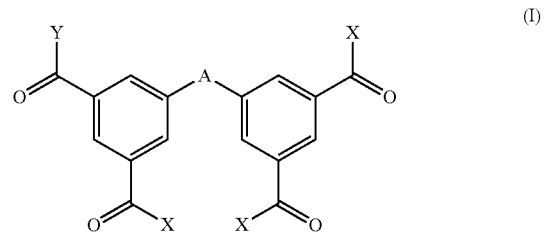

(I)

8 Claims, No Drawings

(56) References Cited

U.S. PATENT DOCUMENTS

| | | |
|---|---|---|
| 4,606,943 A | 8/1986 | Rak et al. |
| 4,626,468 A | 12/1986 | Sundet |
| 4,643,829 A | 2/1987 | Sundet |
| 4,719,062 A | 1/1988 | Sundet |
| 4,758,343 A | 7/1988 | Sasaki et al. |
| 4,761,234 A | 8/1988 | Uemura et al. |
| 4,769,148 A | 9/1988 | Fibiger et al. |
| 4,783,346 A | 11/1988 | Sundet |
| 4,812,270 A | 3/1989 | Cadotte et al. |
| 4,830,885 A | 5/1989 | Tran et al. |
| 4,872,984 A | 10/1989 | Tomaschke |
| 4,888,116 A | 12/1989 | Cadotte et al. |
| 4,948,507 A | 8/1990 | Tomaschke |
| 4,950,404 A | 8/1990 | Chau |
| 4,960,517 A | 10/1990 | Cadotte |
| 5,015,380 A | 5/1991 | Sundet |
| 5,015,382 A | 5/1991 | Sundet |
| 5,019,264 A | 5/1991 | Arthur |
| 5,049,282 A | 9/1991 | Linder et al. |
| 5,051,178 A | 9/1991 | Uemura et al. |
| 5,160,619 A | 11/1992 | Yamaguchi et al. |
| 5,246,587 A | 9/1993 | Tomaschke |
| 5,254,261 A | 10/1993 | Tomaschke et al. |
| 5,290,452 A | 3/1994 | Schucker |
| 5,336,409 A | 8/1994 | Hachisuka et al. |
| 5,510,527 A | 4/1996 | Hachisuka et al. |
| 5,576,057 A | 11/1996 | Hirose et al. |
| 5,582,725 A | 12/1996 | McCray et al. |
| 5,593,588 A | 1/1997 | Kim et al. |
| 5,614,099 A | 3/1997 | Hirose et al. |
| 5,616,249 A | 4/1997 | Hodgdon |
| 5,693,227 A | 12/1997 | Costa |
| 5,733,602 A | 3/1998 | Hirose et al. |
| 5,744,039 A | 4/1998 | Itoh et al. |
| 5,783,079 A | 7/1998 | Kumano et al. |
| 5,843,351 A | 12/1998 | Hirose et al. |
| 5,876,602 A | 3/1999 | Jons et al. |
| 5,989,426 A | 11/1999 | Hirose et al. |
| 6,024,873 A | 2/2000 | Hirose et al. |
| 6,086,764 A | 7/2000 | Linder et al. |
| 6,162,358 A | 12/2000 | Li et al. |
| 6,245,234 B1 | 6/2001 | Koo et al. |
| 6,280,853 B1 | 8/2001 | Mickols |
| 6,337,018 B1 | 1/2002 | Mickols |
| 6,406,626 B1 | 6/2002 | Murakami et al. |
| 6,464,873 B1 | 10/2002 | Tomaschke |
| 6,521,130 B1 | 2/2003 | Kono et al. |
| 6,562,266 B2 | 5/2003 | Mickols |
| 6,723,241 B2 | 4/2004 | Mickols |
| 6,723,422 B1 | 4/2004 | Hirose et al. |
| 6,777,488 B2 | 8/2004 | Araki et al. |
| 6,878,278 B2 | 4/2005 | Mickols |
| 7,279,097 B2 | 10/2007 | Tomioka et al. |
| 7,806,275 B2 | 10/2010 | Murphy et al. |
| 7,815,987 B2 | 10/2010 | Mickols et al. |
| 8,147,735 B2 | 4/2012 | Buschmann |
| 8,177,978 B2 | 5/2012 | Kurth et al. |
| 2011/0049055 A1 | 3/2011 | Wang et al. |
| 2012/0248027 A1 | 10/2012 | Sasaki et al. |
| 2012/0261332 A1 | 10/2012 | Takagi et al. |
| 2012/0305473 A1 | 12/2012 | Ogawa et al. |
| 2013/0089727 A1 | 4/2013 | Nilsen et al. |
| 2013/0126419 A1 | 5/2013 | Ogawa et al. |
| 2013/0256215 A1 | 10/2013 | Nakatsuji et al. |
| 2013/0287944 A1 | 10/2013 | Paul et al. |
| 2013/0287945 A1 | 10/2013 | Roy et al. |
| 2013/0287946 A1 | 10/2013 | Jons et al. |
| 2014/0170314 A1 | 6/2014 | Zhang et al. |
| 2014/0199483 A1 | 7/2014 | Roy et al. |
| 2014/0206900 A1 | 7/2014 | Qiu et al. |
| 2014/0272134 A1 | 9/2014 | Roy et al. |

FOREIGN PATENT DOCUMENTS

| | | |
|---|---|---|
| WO | 2013103666 | 7/2013 |
| WO | 2014014663 | 1/2014 |
| WO | 2014014664 | 1/2014 |
| WO | 2014014666 | 1/2014 |
| WO | 2014014668 | 1/2014 |
| WO | 2014014669 | 1/2014 |
| WO | 2014109946 | 7/2014 |
| WO | 2014109947 | 7/2014 |
| WO | 2014179024 | 7/2014 |

OTHER PUBLICATIONS

Li et al, Polyamide thin film composite membranes prepared from isomeric biphenyl tetraacyl chloride and m-phenylenediamine, Journal of Membrane Science 315, (2008) 20-27.

Petersen, composite reverse osmosis and nanofiltration membranes, Journal of Membrane Science 83, (1993) 81-150.

* cited by examiner

THIN FILM COMPOSITE MEMBRANE DERIVED FROM TETRA-FUNCTIONAL ACYL HALIDE MONOMER

FIELD

The present invention is directed toward thin film composite membranes along with methods for making and using the same.

BACKGROUND

Thin film composite (TFC) membranes are used in a variety of fluid separations. The thin film layer may be formed by an interfacial polycondensation reaction between polyfunctional amine (e.g. m-phenylenediamine) and polyfunctional acyl halide (e.g. trimesoyl chloride) monomers which are sequentially coated upon the support from immiscible solutions, see for example U.S. Pat. No. 4,277,344 to Cadotte. Various polyfunctional acyl halide monomers and combinations of monomers have been studied. For example, U.S. Pat. No. 4,259,183 to Cadotte describes combinations of bi- and tri-functional acyl halide monomers, e.g. isophthaloyl chloride or terephthaloyl chloride with trimesoyl chloride. Tetraacyl halide monomers are also described in the literature, see for example: i) Lei, Li et al., Polyamide Thin Film Composite Membranes Prepared from Isomeric Biphenyl Tetraacyl Chloride and m-Phenylenediamine, Journal of Membrane Science, 315 (2008), pg 20-27; ii) R. J. Peterson, Composite Reverse Osmosis and Nanofiltration Membranes, Journal of Membrane Science, 83 (1993), pp. 81-150 (see for example pg. 116-117) and U.S. Pat. No. 6,162,358 which both describe the use of adamantane-2,6 dione-1,3,5,7 tetra carbonyl chloride, and iii) CN 102219673 which describes the formation of nano filtration membranes using combinations of 5,5'-methylenediisophthaloyl dichloride, trimesoyl chloride and piperazine.

Membranes are commonly characterized in terms of their water and NaCl permeability coefficients, i.e. "A" and "B" values; see Mulder, Basic Principles of Membrane Technology, $2^{nd}$ Ed., Kluwer Academic Publishers (1996). While reverse osmosis (RO) membranes commonly have B values for NaCl of less than 0.3 GFD, much lower values (e.g. less than 0.04 GFD) are desired in specialty applications.

SUMMARY

A method for making a composite polyamide membrane including a porous support and a thin film polyamide layer, wherein the method includes the step of applying a polyfunctional amine monomer and a tetraacyl halide monomer represented by Formula (I) to a surface of the porous support and interfacially polymerizing the monomers to form a thin film polyamide layer;

Formula (I):

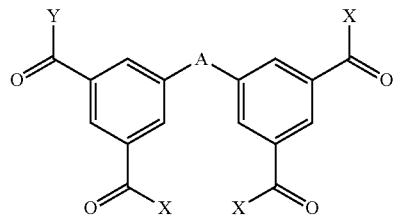

wherein A is selected from: oxygen (—O—); carbon (—C—); silicon (—Si—); each of which may be unsubstituted or substituted, e.g. with alkyl groups of 1-4 carbon atoms; or a carbonyl group (—C(O)—), X is the same or different and is selected from a halogen, and Y is selected from the group comprising a halogen and a hydroxide. Preferred embodiments produce membranes having B values of less than or equal to 0.04 GFD.

DETAILED DESCRIPTION

The invention is not particularly limited to a specific construction or shape of composite membrane. For example, the present invention is applicable to flat sheet, tubular and hollow fiber polyamide membranes generally useful in reverse osmosis (RO). RO membranes are relatively impermeable to virtually all dissolved salts and typically reject more than about 95% of salts having monovalent ions such as sodium chloride. Organic molecules with molecular weights greater than approximately 100 Daltons are also well rejected. By contrast, nanofiltration (NF) membranes are often characterized as those having a substantial passage of neutral molecules having molecular weights less than 200 daltons and monovalent ions. These membranes still commonly possess high rejection of divalent ions due to charge interactions. In both cases, membranes are often characterized by water and salt permeability values.

A water permeability coefficent (A value) can be defined as the flux (permeate volumetric flow rate per unit area of active membrane) divided by the net driving pressure. The net driving pressure is calculated by subtracting the permeate pressure and the osmotic pressure difference across the membrane from the applied pressure. While the water permeability coefficient is often considered a fundamental characteristic of the membrane, it can be observed to vary predictably as a function of temperature, concentration, and applied pressure. For purposes of this invention, the A value is also calculated based on a 25° C. tests at 225 psi with 2000 ppm NaCl, pH 8.

The solute permeability coefficient (B value) determines the rate at which salt diffuses through a membrane. (See, for example Osada & Nakagawa, *Membrane Science and Technology*, Chapter 9, "Reverse Osmosis," Marcel Dekker, Inc., New York, 1992). The solute permeability coefficient is one of the fundamental parameters of an osmotic membrane but its value is known to vary with solute composition and particularly with temperature. For a specific set of operating conditions, the solute permeability coefficient of a membrane $B_{mem}$ may be calculated from flux J and the intrinsic solute passage $C_p/C_m$, according to the following formula:

$$B_{mem} = (J^* C_p/C_m)/(1 - C_p/C_m)$$

In this equation, $C_p$ and $C_m$ represent the concentrations of solute in the permeate and at the membrane's surface on the feed side, respectively. The concentration at the membrane's surface may be greater than the concentration in the feed due to concentration polarization. For purposes of this invention, the B-value is calculated based on a 25° C. tests at 225 psi with 2000 ppm NaCl, pH 8.

For a reverse osmosis membrane having 95% rejection at 25 GFD, the B value is approximately 1 GFD. Membranes of the present invention may have B values of less than 0.3 GFD. Preferred membranes made according to the present invention have a solute permeability coefficient for NaCl (B value) of less than or equal to: 0.04, 0.035, and in some embodiments less than or equal to 0.03 GFD (gallons/ft²/day).

In one embodiment, the invention includes a standard flat sheet construction comprising a bottom layer (back side) of a nonwoven backing web (e.g. PET scrim), a middle layer of a porous support having a typical thickness of about 25-125 μm and top layer (front side) comprising a thin film polyamide layer having a thickness preferably less than about 1 micron, e.g. from 0.01 micron to 1 micron but more preferably from about 0.01 to 0.1 μm. The porous support is preferably a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 μm. In some instances pore diameters larger than about 0.5 μm permit the polyamide layer to sag into the pores and disrupt a flat sheet configuration. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m². The polyamide layer is preferably prepared by an interfacial polycondensation reaction between a polyfunctional amine monomer and a polyfunctional acyl halide monomer upon the surface of the porous support as generally described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution. Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer comprises at least two primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diaminoethyl) amine). Preferred examples including polyfunctional amine monomers including two or three primary amino groups. Other examples include aromatic species. Still other examples include aromatic species with two or three primary amino groups. One preferred polyfunctional amine is m-phenylene diamine (mPD). The polyfunctional amine monomer may be applied to the porous support as a polar solution. The polar solution may contain from about 0.1 to about 20 weight percent and more preferably from about 0.5 to about 8 weight percent polyfunctional amine monomer. Once coated on the porous support, excess solution may be optionally removed.

For purposes of the present invention, the polyfunctional acyl halide monomer comprises a tetraacyl halide monomer as represented by Formula (I).

Formula (I):

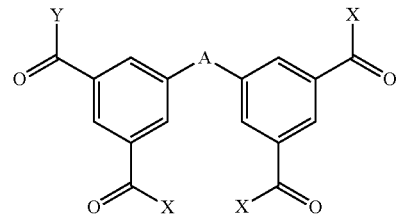

wherein A is selected from oxygen: (—O—); carbon (—C—); silicon (—Si—); each which may be unsubstituted or substituted, e.g. with alkyl groups of 1-4 carbon atoms; or a carbonyl group (—C(O)—), X is the same or different and is selected from a halogen, and Y is selected from a halogen and hydroxide. Representative structural formulae for varies subclasses of tetraacyl compounds are provided below (Formula II-VI).

Formula (II):

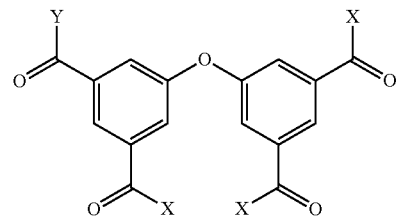

Formula (III):

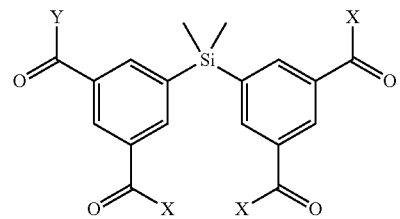

Formula (IV):

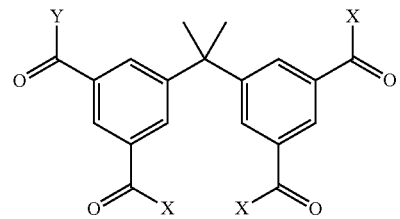

Formula (V):

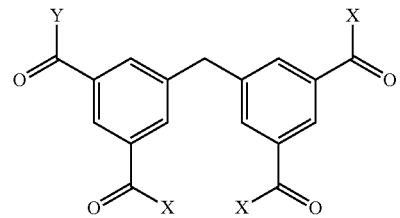

Formula (VI):

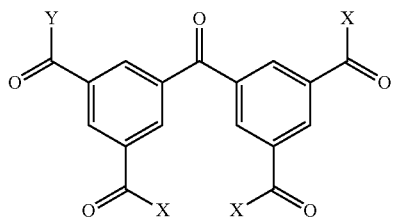

In a preferred embodiment, each X and Y is chlorine. In another preferred embodiment, A is an unsubstituted carbon as represented in Formula V, i.e. the subject monomer is 5,5'-methylene diisophthaloyl dichloride.

The polyfunctional acyl halide monomer is preferably coated upon the porous support from an organic-based or non-polar solvent. The polyfunctional acyl halide may be dissolved in a non-polar solvent in a range from about 0.01 to 10 weight percent, preferably 0.05 to 3 weight percent and may be delivered as part of a continuous or batch coating operation. The selection of non-polar solvent is not particularly limited and combinations of multiple solvents may be used. The solvent is preferably a liquid at 20° C. (101 kPa). The solvent preferably has a water solubility of less than 800 ppm (and more preferably less than 500, 400, 300, or 200, or in some embodiments, less than 150 ppm). As used herein, the term "water solubility" refers to the concentration of water that is soluble in a chosen hydrocarbon solvent measured at 20° C. (101 kPa) as measured by ASTM D4928-11. Non-limiting examples of applicable solvents include: paraffins (e.g. hexane, cyclohexane, heptane, octane, dodecane), isoparaffins (e.g. ISOPAR™ L), aromatics (e.g. Solvesso™ aromatic fluids, Varsol™ non-dearomatized fluids, benzene, alkylated benzene (e.g. toluene, xylene, trimethylbenzene isomers, diethylbenzene)) and halogenated hydrocarbons (e.g. FREON™ series, chlorobenzene, di and trichlorobenzene) or mixtures thereof. Preferred solvents include from 1 to 40, 2 to 20, or 3 to 15 weight percent of aromatic content such as 1,3,5-trimethyl benzene. Other preferred solutions include over 50 weight percent of a paraffin or isoparaffin such as ISOPAR™ L. Still other examples meet both the preceding criteria.

As previously described, the step of applying the polyfunctional monomers to the surface of the porous support preferably involves applying a polar solution comprising the polyfunctional amine monomer and a non-polar solution comprising the polyfunctional acyl halide monomer. The step of applying the solutions preferably involves coating by way of spraying, film coating, rolling, or through the use of a dip tank. Once brought into contact with one another, the polyfunctional acyl halide and polyfunctional amine monomers react at their surface interface to form a polyamide layer. This layer, often referred to as a polyamide "discriminating layer" or "thin film" layer, provides the composite membrane with its principal means for separating solute (e.g. salts) from solvent (e.g. aqueous feed). The reaction time of the polyfunctional acyl halide and the polyfunctional amine monomer may be less than one second but contact times typically range from about 1 to 60 seconds, after which excess liquid may be optionally removed by way of an air knife, water bath(s), dryer or the like. The removal of the excess solvent can be achieved by drying at elevated temperatures, e.g. from about 40° C. to about 120° C., although air drying at ambient temperatures may be used.

Alternative polyfunctional acyl halide monomers may also be used in combination with the tetraacyl halide monomer of Formula I. Combination may include from 10:1 to 1:10, and more preferably 10:1 to 1:2 of the subject tetraacyl halide monomer of Formula I to all other species of polyfunctional acyl halide monomers. These alternative monomers are not particularly limited and aromatic or alicyclic polyfunctional acyl halides can be used along with combinations thereof. Non-limiting examples of aromatic polyfunctional acyl halides include: trimesic acid chloride, terephthalic acid chloride, isophthalic acid chloride, biphenyl dicarboxylic acid chloride, and naphthalene dicarboxylic acid dichloride. Non-limiting examples of alicyclic polyfunctional acyl halides include: cyclopropane tri carboxylic acid chloride, cyclobutane tetra carboxylic acid chloride, cyclopentane tri carboxylic acid chloride, cyclopentane tetra carboxylic acid chloride, cyclohexane tri carboxylic acid chloride, tetrahydrofuran tetra carboxylic acid chloride, cyclopentane dicarboxylic acid chloride, cyclobutane dicarboxylic acid chloride, cyclohexane dicarboxylic acid chloride, and tetrahydrofuran dicarboxylic acid chloride. Non-limiting examples of aliphatics include adipoyl chloride, malonyl chloride, glutaryl chloride, and sebacoyl chloride. A preferred class of polyfunctional acyl halide monomers includes 2 to 3 acyl halide groups. One particularly preferred polyfunctional acyl halide is trimesoyl chloride (TMC).

In yet another embodiment, the subject tetraacyl halide monomer may be coated sequentially after an initial coating of an alternative polyfunctional acyl halide monomer as just previously described.

EXAMPLES

All the composite polyamide membranes were made using polysulfone porous supports produced using a pilot scale manufacturing facility. The polysulfone supports were cut into pieces, attached to wire frames and dipped in water for approximately 30 minutes. The supports were then removed and immersed in an aqueous 3 wt % mPD solution for approximately 20 minutes. The support was then placed on a paper towel on top of a plastic sheet and excess solution was nipped off with a roller. A gasket and a plastic sheet were placed on the support and clamped on four sides to make a leak proof seal at the edges. Various coating solutions comprising 60 mL of Isopar L and indicated quantities of: i) 1,3,5 trimethylbenzene (mesitylene), ii) trimesoyl chloride ("TMC"), iii) 5,5'-methylenediisophthaloyl dichloride ("Tetra"), and iv) different wt % combinations of TMC and Tetra (50:50, 60:40) were poured upon the mPD soaked support and allowed to react for approximately a minute. Residual coating solution was then poured off and the membrane was rinsed with 80 mL hexane, air-dried for approximately a minute, and stored in RO water before testing. From each membrane, 2 coupons were cut and tested in a flat cell bench test bench at room temperature using a 2000 ppm NaCl aqueous solution at 225 psi. Flux and percent NaCl passage where measured and A and B values calculated as per the methodology previously described. Results are summarized in Table 1. Membrane samples formed using the subject tetraacyl halide monomer had significantly lower B values than comparative membrane samples. For example, the membrane of example 1 was prepared using the subject tetraacyl halide monomer and had a B value of 0.016 GFD; whereas a comparable membrane made with TMC had a B value of 0.093 GFD.

TABLE 1

| Example | Acyl halide monomer | w/w % mesitylene in total solution | Flux (GFD) | % NaCl Passage | A Value (GFD/psi) | B Value (GFD) |
|---|---|---|---|---|---|---|
| 1 | 100% Tetra | 8 | 7.4* | 0.22* | 0.037 | 0.016 |
| 2 | 100% TMC | 8 | 28.5 (0.61) | 0.32 (0.08) | 0.142 (0.003) | 0.093 (0.023) |
| 3 | TMC:Tetra (50:50) | 4 | 8.5 (0.61) | 0.27 (0.06) | 0.042 (0.003) | 0.023 (0.005) |
| 4 | TMC:Tetra (60:40) | 4 | 9.8 | 0.30 | 0.049 | 0.029 |
| 5 | 100% TMC | 0 | 15.5 (1.095) | 0.27 (0.0436) | 0.076 (0.006) | 0.042 (0.01) |

Flux, NaCl, A and B values represent mean values.
*indicates only two data points.
No standard deviation is provided where data was collected from only two coupons.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. The entire subject matter of each of the aforementioned US patent documents is incorporated herein by reference.

The invention claimed is:

1. A method for making a composite polyamide membrane comprising a porous support and a thin film polyamide layer with a B value less than or equal to 0.04 gallons/ft$^2$/day (GFD), wherein the method comprises the step of applying an aromatic polyfunctional amine monomer and a tetraacyl halide monomer represented by Formula (I) to a surface of the porous support and interfacially polymerizing the monomers to form a thin film polyamide layer;

Formula (I):

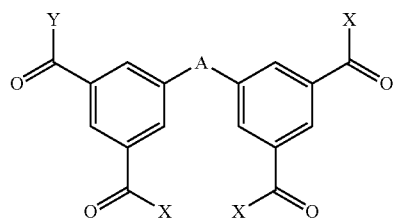

wherein A is selected from: oxygen (—O—), carbon (—C—), silicon (—Si—), each of which may be unsubstituted or substituted with alkyl group having from 1 to 4 carbon atoms; or a carbonyl group (—C(O)—), X is the same or different and is selected from a halogen, and Y is selected from halogen and hydroxide.

2. The method of claim 1 wherein the composite membrane has a B value less than or equal to 0.03 gallons/ft$^2$/day (GFD).

3. The method of claim 1 wherein the polyfunctional amine monomer comprises primary amino functional groups.

4. The method of claim 1 wherein the polyfunctional amine monomer comprises m-phenylenediamine.

5. The method of claim 1 wherein the tetraacyl halide monomer of Formula (I) is coated upon the surface of the porous support from a non-polar solution wherein the solution comprises a solvent selected from at least one of: alkylated benzene, paraffin and isoparaffin.

6. The method of claim 5 wherein the non-polar solution further comprises a polyfunctional acyl halide monomer distinct from the monomer represented by Formula (I).

7. The method of claim 5 wherein the non-polar solution further comprises trimesoyl chloride.

8. The method of claim 1 wherein the tetraacyl halide monomer is represented by Formula (V):

Formula (V):

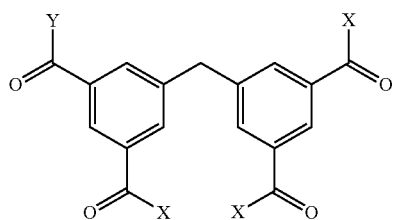

wherein X is the same or different and is selected from a halogen, and Y is selected from halogen and hydroxide.

* * * * *